Feb. 5, 1957  E. R. BOSE  2,779,969
APPARATUS FOR THE CONTINUOUS MANUFACTURE
OF COMPRESSED BOARDS AND SHEETS
Filed Jan. 15, 1953  5 Sheets-Sheet 1
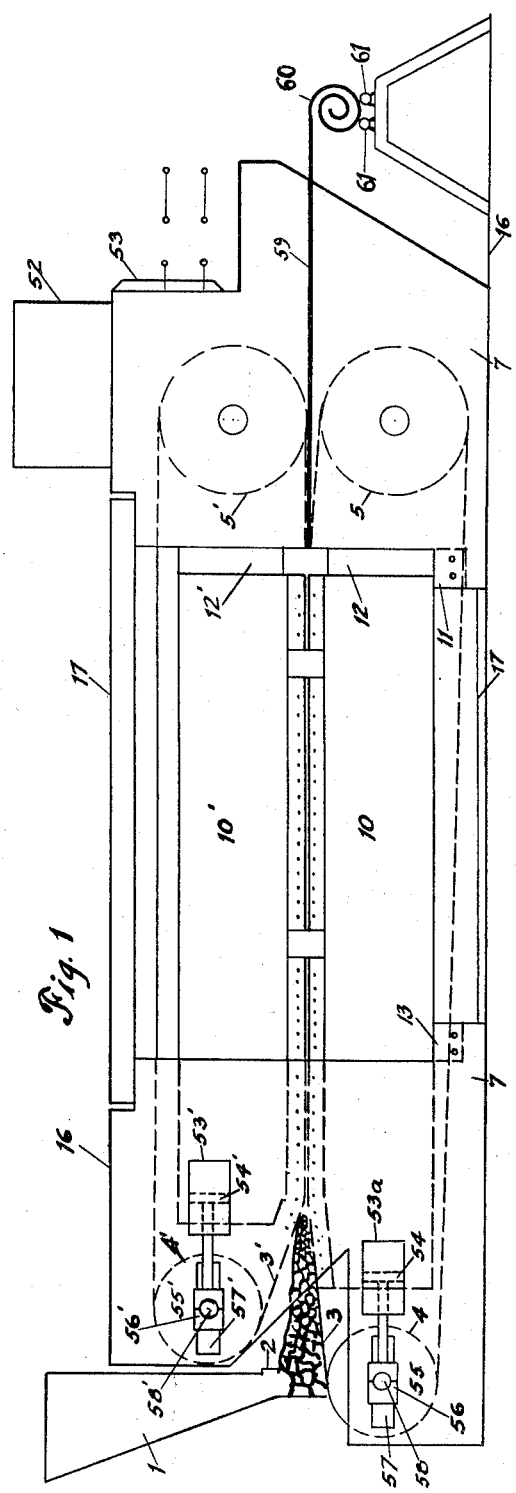
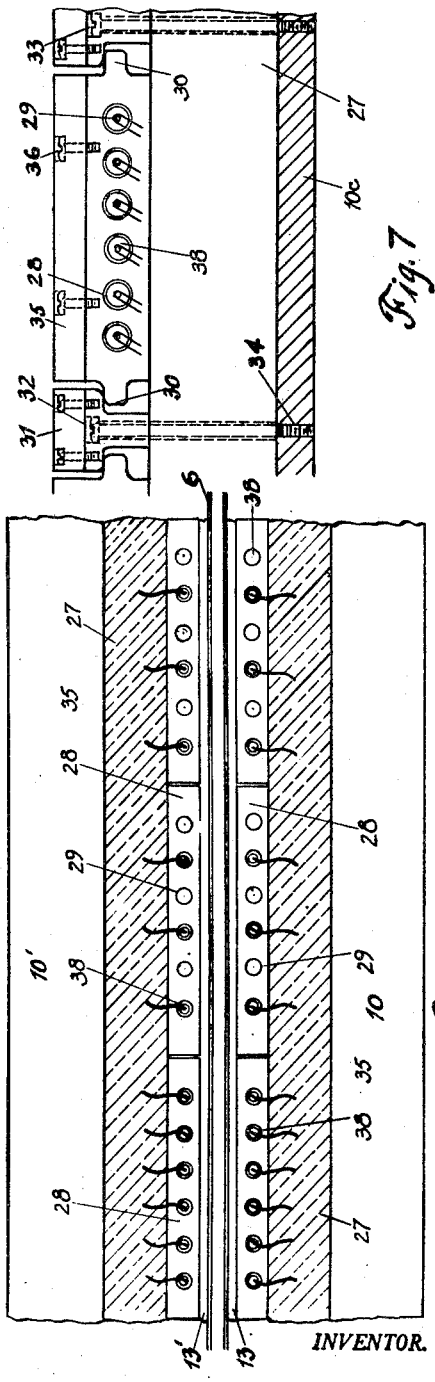
INVENTOR.
EDWARD R. BOSE
BY Joseph Hirschman
ATTORNEY

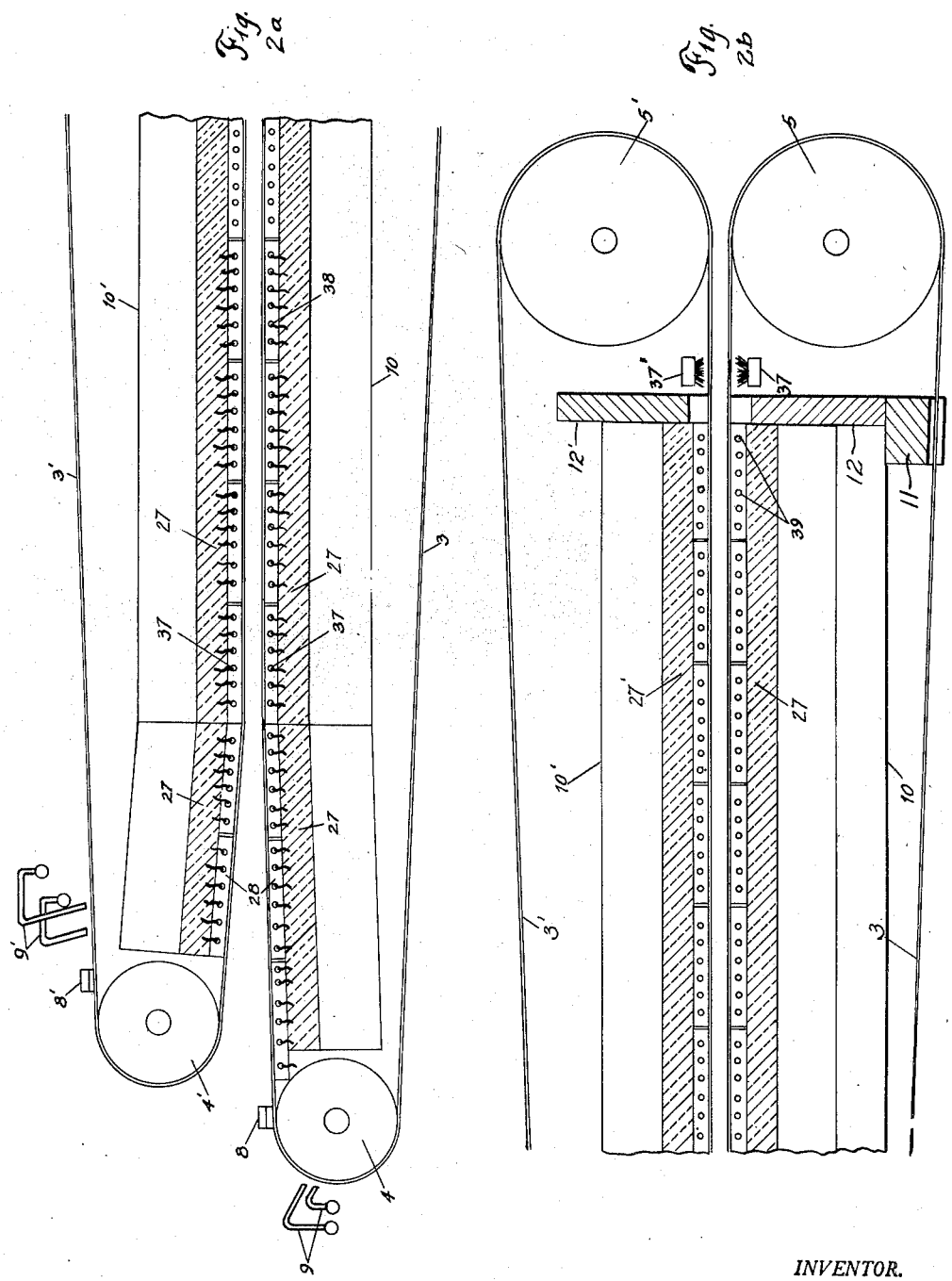

INVENTOR.
EDWARD R. BOSE
BY
ATTORNEY

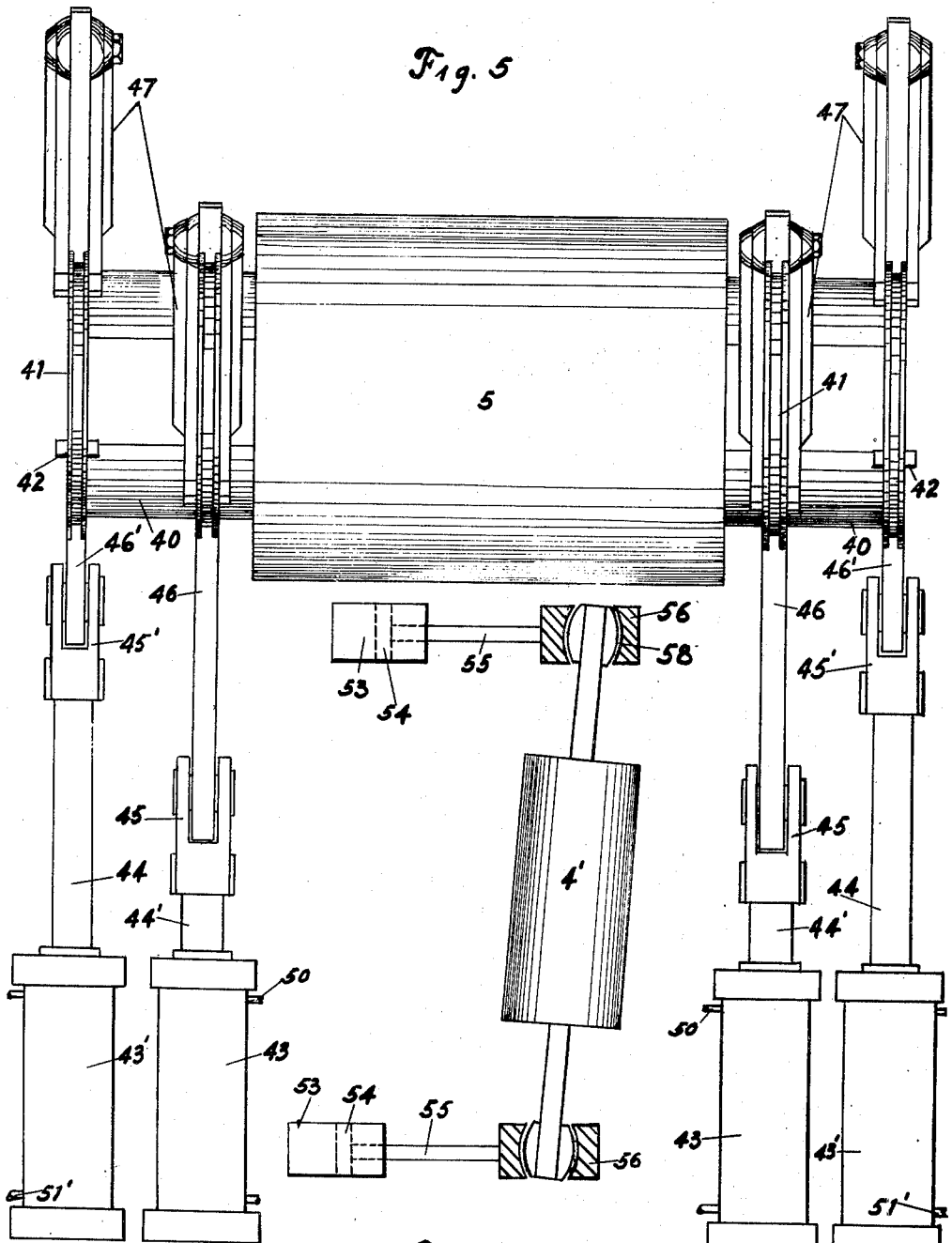

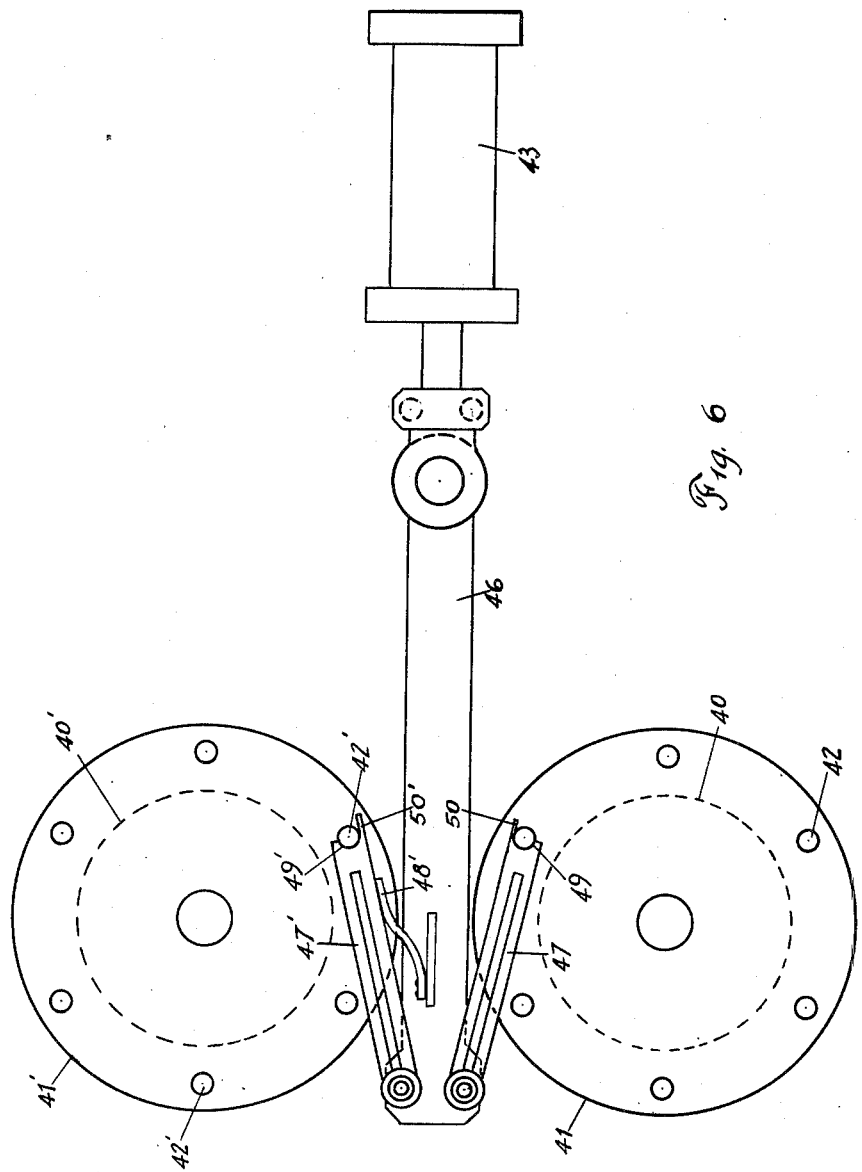

United States Patent Office 2,779,969
Patented Feb. 5, 1957

2,779,969

APPARATUS FOR THE CONTINUOUS MANUFACTURE OF COMPRESSED BOARDS AND SHEETS

Edward Ralph Bose, Jersey City, N. J., assignor to United Cork Companies, Kearny, N. J., a corporation of New Jersey Application January 15, 1953, Serial No. 331,427

16 Claims. (Cl. 18—5)

The present invention relates to the manufacture of boards or sheets formed of cohering small particles of compressible material, such as cork, wood chips and sawdust and other cellulosic material and the like, and more particularly to an improved apparatus for the continuous manufacture of such boards or sheets from compressible discrete particles containing or having added thereto a bonding material such as a thermoplastic or thermosetting resin, or the like.

The present application is a continuation-in-part of my co-pending application Serial No. 181,212, filed August 24, 1950, and now abandoned.

It is the general object of the invention to provide an improved apparatus for the manufacture of compressed cohesive boards or sheets made of relatively small particles of any suitable material, with or without added binder, by continuous operation, whereby a high output of a uniform product may be obtained.

It is a further object of the invention to provide a simple and efficient apparatus for accomplishing the continuous and substantially uniform heating and/or cooling, and continuous compression in the heated and/or cooled state of a mass of particles continuously fed to such apparatus.

More specifically, it is an object of the invention to provide an apparatus for the continuous manufacture of boards and sheets, wherein a mass of discrete resilient particles continuously fed thereto, is compressed between moving endless conveyor belts which provide between them and between lateral guides a die or mold of exact predetermined size, and retain their relative positions for a sufficient time to effect the curing or setting of the indigenous or added binder in the particles to form a strong board of compressed cohesive particles, the belts acting to compress and convey the bonded particles and moving at the same predetermined speed as the mass of particles, so that there is substantially no relative motion between the belts and said particles.

It is also an object of the invention to provide an apparatus wherein heat is conducted to and abstracted from the compressed particles through highly conductive materials, so that the heating and cooling are effected in a minimum of time.

It is a further object of the invention to provide mechanism which acts to heat the mass of compressed particles both by conduction and by radiation, so that heating of the particles to a degree sufficient to fuse the binder is effected within a relatively short length of travel of the particles between the belts.

Additional objects of the invention are to provide means for reducing the friction between the travelling endless belts and the table or plate against which they bear, without materially reducing the rate of heat transfer to and from the compressed particles; to provide an improved floating support for the table or plate against which the belts are pressed by the heated particles whereby rigidity in a direction transverse to the belts is maintained, while allowing longitudinal expansion and contraction of such table or plate, without altering the essential dimensional relationships of the parts of the apparatus; to provide an improved mechanism for maintaining the belt continuously under adequate tension; and to provide a simple, reliable, and at the same time economical mechanism for operating the driving pulleys.

Other objects and advantages of the invention will appear from the following detailed description thereof taken in connection with the accompanying drawings which show, by way of example, a satisfactory embodiment of my improved apparatus. In said drawings, Fig. 1 is a diagrammatic view in elevation of a machine built in accordance with the invention;

Figs. 2a and 2b show on an enlarged scale the belt driving and guiding means with the heating and cooling devices in direct contact with the belts;

Fig. 4 is an enlarged fragmentary section of a portion of the conveying and heating mechanism, illustrating an insulated support for the lower and upper beds;

Fig. 5 is a plan view of one of the driving pulleys showing the fluid operated mechanism for driving the same;

Fig. 6 is a side view of the pulley driving mechanism;

Fig. 7 shows a detail of the belt-supporting bed; while

Fig. 8 is a plan view, partly in section, of the take-up mechanism for the belt guide pulleys.

Figure 3:
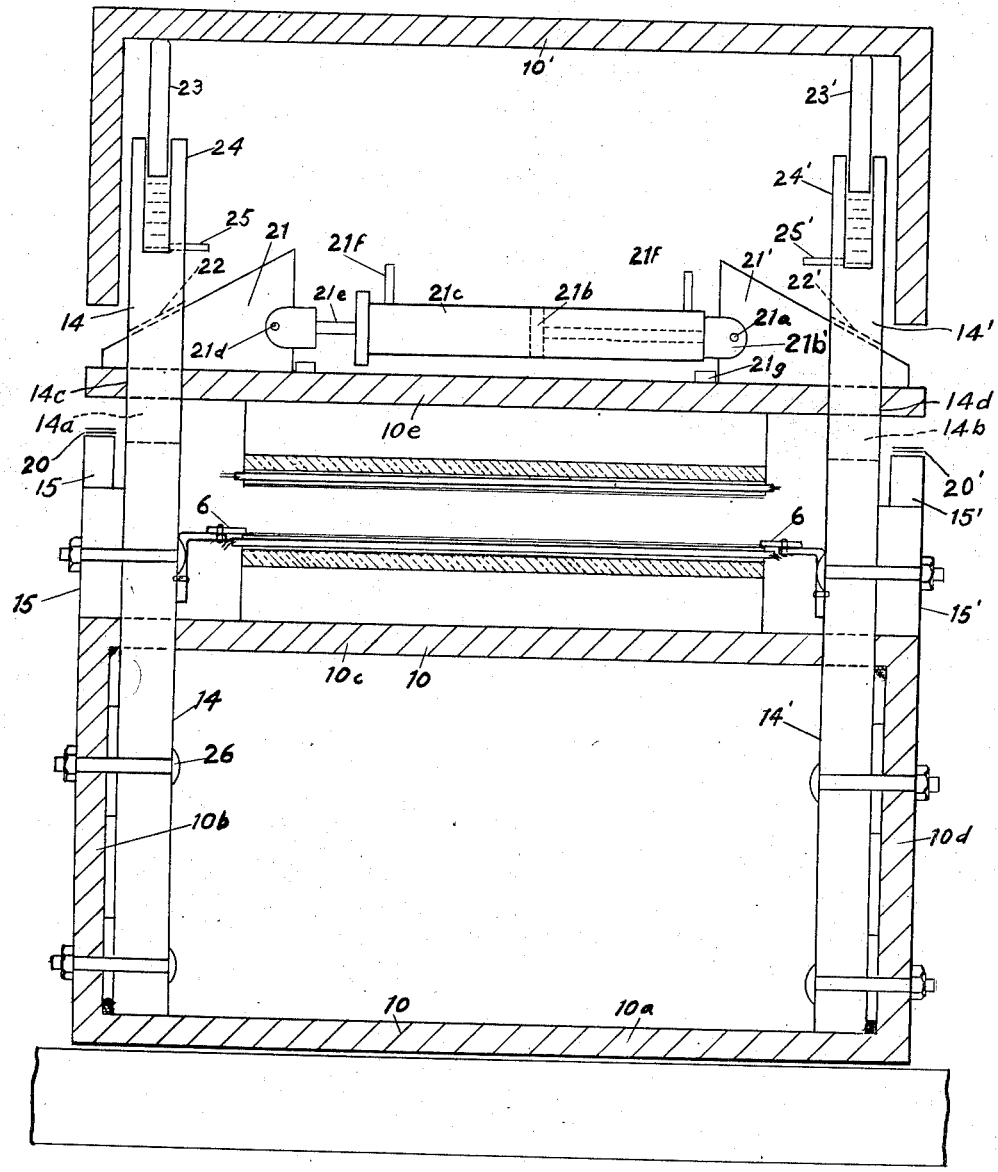
Fig. 3 is a transverse section of the apparatus illustrating certain features of the invention and in particular the use of carbon blocks for reducing belt friction, and a floating wedge mechanism for locking the upper bed in adjusted position.

Although many attempts have been made to devise an apparatus for the continuous manufacture of boards and sheets from comminuted material like cork, wood, and other fibrous matter, with or without an additional binder, no successful machine of this type has, so far as I am aware, been placed in commercial operation prior to the present invention.

Despite the obvious desirability of a machine for use in the cork, wood and cellulosic fiber industry for the continuous manufacture of boards and sheets of a high degree of cohesive strength, to replace the heretofore widely employed batch processes on the usual presses, utilizing various heating and cooling methods, and despite the various suggestions that have been made for the design of an apparatus operating on the continuous principle, there has heretofore been available no machine which can produce such boards and sheets continuously and of uniform and acceptable quality.

My researches have shown that a number of factors are responsible for the failure of prior machines. The more important of these factors are the following:

1. The mechanisms heretofore provided have been unable to keep the moving belts or conveyors reasonably parallel and running together at exactly the same speed.

2. The power requirements of the machine have been excessive and exceeded the mechanical limits of the necessary transmitting gears or other mechanism on the belt or conveyor.

3. The heating means heretofore employed or suggested were inadequate to provide the necessary degree of heat for raising the temperature of the material being processed fast enough to warrant the cost of such a machine.

4. The machines have been unable to cool the material in process quickly enough to permit the high operating speeds required of such a machine.

5. The machines have been unable to keep the belts or conveyors running straight and true.

6. The machines have not provided for the expansion and contraction of those members of the machine which are subjected to the high heat.

I have found that the above and other difficulties encountered in prior machines are satisfactorily overcome by the apparatus of the present invention, which will now be described, reference being had to the accompanying drawings.

The particles to be processed are first prepared as may be required, as by being suitably graded, admixed with resinous material if they do not contain a sufficient amount to produce a cohesive board, etc., and are then dumped into a supply hopper whose discharge end portion is shown at 1. The discharge opening at the bottom of the hopper is provided with an adjustable gate which permits a quantity of material of approximately uniform height to be deposited on the lower endless steel belt 3. The supply hopper may be of any suitable construction which will insure a steady feed of raw material of uniform thickness or height onto the belt. I prefer to employ, in conjunction with the gate, a vibrating table which can be synchronized with an electric eye operating to insure a uniform height and density of material on the belt. The uniformity of the height of the mass of particles on the belt can be further insured by providing a levelling gate or blade following the electric eye. These parts of my apparatus have not been illustrated as their construction and mode of operation are well known.

The mass of particles deposited on the lower belt 3 is carried forward by the forward motion of the belt toward the drive end of the machine, i. e., toward the right as viewed in Fig. 1. After a short travel, the material comes into contact with the upper steel belt 3'. As shown in Figs. 1 and 2, the initial portions of both belts are inclined toward each other, so that the particles are compressed up to the point where the belts run parallel to each other. The distance between the belts is determined by the relative position of the tables or beds associated with the belts and shortly to be described, and such belt separation determines the final thickness of the finished product. By varying the quantity of material deposited on belt 3 from the hopper, variations of density in the finished product can be obtained.

The belts travel over the guide pulleys 4 and 4' and drive pulleys 5 and 5', respectively. The drive pulleys may be covered with a suitable friction covering, such as cork or the like, or any appropriate coating to increase the friction between the drive pulley and the belts to prevent slippage. Between the belts, and adjacent to their outer edges are the side guides 6 (Figs. 3 and 4) which are of a height corresponding to the distance between the belts and are suitably supported from the frame 7 of the machine. These side guides are held firmly in position and prevent the compressed material from expanding out from between the belts, so that the travelling belts within the guides form in effect a travelling mold of fixed dimensions. I have found that such fixed guides are more practical than travelling side belts and, in addition, are considerably more economical. To insure separation of the molded board from the belts at the discharge end of the latter, I provide reciprocating brushes or pads 8, 8' (Fig. 2a), which uniformly distribute across the entire surface of the belts a suitable mold release compound, such as a higher fatty acid, like stearic acid, or a metal soap, or the like which keeps the compressed board from sticking to the belts as it emerges from the machine. The mold release compound is applied ahead of the respective pad or brush 8, 8' as by means of an automatic dispensing means shown diagrammatically at 9, 9'.

As appears best from Figs. 1, 2a, 2b and 4, the belts 3 and 3' for nearly the whole of their run between pulleys 4, 4' and 5, 5' are supported against tranversely rigid and fixed tables or beds 10, 10'. These beds must be sufficiently strong and rigid to withstand the pressures arising both from the compression of the mass of particles produced at the inclined portions of the belts and during the heating of the particles, as will be described hereinbelow. They must be free from transverse deflection to insure a uniform product and a uniform stress on the travelling belts. In accordance with the invention, these beds are, however, so supported that they are free to move, i. e., expand or contract, longitudinally of the belts, i. e., along their length, so as to prevent any stresses from arising as a result of expansion or contraction of the beds. To accomplish this, I support the lower bed 10 slidingly on the cross member 11. The cross member ties the machine frame 7 together with its companion piece on the other side of the machine. The forward motion of the belt will drag the bed forward against a beam 12 which is rigidly mounted on the frame and acts as a forward stop. The rear end of the bed is supported on the lower cross beam or support 13, which may take the form of a sliding shoe or roller. Since the lower bed 10 is restrained from moving toward the drive pulley 5 by the stop beam 12, any expansion or contraction of the bed takes place over the shoe or roller on cross beam 13.

The upper bed 10' is similarly provided with a floating support which is nevertheless adequately rigid in the transverse direction. The upper bed 10' is supported from the lower bed 10 by the supporting posts 14, 14' (Fig. 3). The upper bed is likewise provided with a stop beam 12' to prevent it from being pulled toward the drive pulley 5'. When the apparatus is in operation, the upper bed 10', which includes the plate 10e rigidly secured thereto, is held at the selected distance from the lower bed (depending on the desired thickness of the fabricated board) by the positioning blocks 15, 15' secured to the posts 14, 14' and upon which the plate 10e normally rests. The plate 10e is apertured, as indicated at 14c and 14d, to receive snugly the posts 14 and 14' along which they can slide vertically. To insure accurate setting of the distance between the beds, there can be placed upon the blocks 15 a suitable number of thin metallic shims 20. In this manner, any desired distance between the beds is maintained. After the selected distance has thus been set, the upper bed is locked in position by a number of sets of wedge blocks 21, 21' which are forced against the upper inclined faces 22, 22' of suitable slots 14a, 14b in the posts 14, 14'. As many sets of wedge blocks may be provided as there are pairs of aligned posts 14, 14'. These blocks provide a rigid lock for the upper bed as they bear against the inclined sides 22 and 22', on the one hand, and against the plate 10e, on the other, and enable such bed to withstand the pressure of the compressed material, which far exceeds the weight of the upper bed and would lift the latter if it were not locked against upward displacement. To permit adjustment of the upper bed, the wedge blocks 21, 21' are withdrawn and the upper bed then raised to any desired position by the cylinder pistons 23, 23' of the cylinders 24, 24' fixed to or forming a part of posts 14, 14' and connected by pipes 25, 25' to a source of hydraulic pressure.

The wedge blocks 21, 21' are preferably operated hydraulically, and as shown in Fig. 3 each pair is connected to a piston and cylinder mechanism which "floats" between the blocks. One of the blocks of each pair, such as block 21'. is pivotally secured at 21a to the enlarged end 21' of the rod of a piston 21b disposed in the cylinder 21c. The other block 21 is pivoted at 21d to a rod 21e which is rigidly connected to cylinder 21c. Compressed fluid is alternately charged to and discharged from the opposite sides of the piston 21b through pipes 21f. The parts are shown in Fig. 3 in the retracted position of the wedge blocks effected by introducing pressure fluid to the right side of piston 21b. As the pressure fluid acts both on the left side of the piston and on the right wall of the cylinder, the less strongly wedged of the blocks 21, 21' will be withdrawn from the aperture in the associated post 14 by movement of the piston or cylinder, to whichever it is attached, until it strikes the stop 21g, whereupon the cylinder or piston, respectively, moves to pull the other wedge out of locking position until it strikes its own stop 21g. Fluid is then charged into cylinders 24, 24' to lift the bed 10', 10e to the position shown in Fig 3. To lower the bed, pressure fluid is introduced at the left side of cylinder 21c, while conduits 25, 25' are connected to a discharge pipe (not shown), whereupon wedge blocks 21, 21' move to a greater extent into slots 14a, 14b, thereby depressing the bed 10' until the plate 10e rests on blocks 15, 15' or on the interposed shims 20, 20'.

The beds 10, 10' are each in the form of a long hollow rectangular box composed of rectangular plates suitably welded to each other, such plates being indicated at 10a, 10b, 10c and 10d in Fig. 3. These beds, in one commercial form of the machine, are about 70 inches wide and 22 feet long. The top plate 10c of the bed 10 and, as already stated, the corresponding bottom plate 10e of the bed 10' are apertured to receive the supporting posts 14, 14' for the upper bed, these posts being in the form of solid steel columns bolted to the vertical side walls of the lower bed 10, as indicated at 26. These posts may be spaced about 3 feet apart inside of the beds.

As shown best in Fig. 7, which illustrates the beds and the associated parts on an enlarged scale, a heat-insulating layer 27, which can be about 4 inches thick, lies directly on the upper plate 10c and is secured to the plate 10c by bolts, screws, or the like. The insulating material should be one capable of withstanding the temperatures to which it is exposed and may be made of asbestos, glass wool, and the like. Upon the inner face of the insulating layer 27 are disposed a series of metallic blocks 28, which are preferably made of aluminum and are provided with through apertures 29 for a purpose which will be described hereinafter. These blocks are provided with reduced ends 30 forming shoulders which are engaged by clamping members 31 of T-shape which are positioned between, but whose stem is spaced from, the opposed reduced ends of successive blocks. The clamping members are counterbored, as shown at 32, to receive the heads of screws which pass loosely through aligned apertures in the clamping members and in the insulating element 27 and are threaded into tapped holes 34 in the plate 10c of the lower bed. By this construction the metal blocks 28 are securely clamped to the bed 10 but are able to expand and contract freely with changes of temperature.

The outer faces of the blocks 28 are provided with suitable means forming a continuous anti-friction surface, or surface of low coefficient of friction, with respect to the steel bands travelling thereover. In the preferred form of the invention, such continuous anti-friction surface is provided by plates of compressed carbon 35 which are more or less coextensive with the blocks 28 and with the clamping members 31, and are suitably anchored to the parts 28 and 31, as by means of screws 36 received in counterbored apertures in the carbon plates, and threadedly engaged with tapped holes in the blocks 28. These carbon plates greatly reduce the friction which must be overcome by the travelling belts and correspondingly reduce the power required to operate the machine. To maintain a high degree of friction between the belts and their respective driving pulleys, I provide reciprocating brushes 37 which engage the inner surface of the belts and remove any adhering carbon or other anti-friction particles before the belts reach their respective driving rolls 5, 5'. It will be understood that the description of the structure associated with the lower bed 10 applies also to the upper bed 10', and the same reference characters have been applied thereto to indicate corresponding parts.

In accordance with the invention, the compressed material between the belts is heated in order to fuse the natural resins contained therein or any thermoplastic resin added thereto, or to cure and harden any added thermosetting resin. To this end, the metallic blocks 28 are provided with electrical heating elements 38 which run the entire width of the bed. The heating elements are inserted in the through apertures 29 and are connected in any suitable manner to the power lines. It is desirable that the heating elements be uniformly spaced at close intervals in the metal blocks. Thereby a rapid and even distribution of the heat is obtained. Standard control instruments for regulating the temperature can be employed and with their aid it is possible to obtain a temperature throughout the heated zone of the upper and lower beds which varies by no more than 5° F. The insulation 27 prevents undue heat loss from the metal blocks to the beds 10, 10'. At the discharge end portion of the beds the blocks are provided with cooling tubes 39 (Fig. 2b) for receiving cooling water, such tubes likewise extending for the full width of the beds. The opposite ends of the tubes are connected to water supply and discharge manifolds (not shown). Between the heated and cooled portions of the blocks, an unheated and uncooled intermediate section may be provided but, if desired, the cooled sections can follow immediately after the heated sections of the beds. I prefer to make the blocks of standard form with apertures of a size adapted to receive either electrical heating elements or cooling tubes and the degree and speed of heating can be controlled by the number of heating elements provided in each block.

Because of the pressures generated within the compressed mass of particles as they are heated in the course of their travel between the belts, the latter are forced against the supporting beds at high unit pressures. Even with the aid of a belt lubricant, such as the highly compressed carbon plates or blocks 35 above described, a very great force is nevertheless required to move the belts forward. Thus, with a unit pressure of 1000 pounds per square inch exerted by a belt against its bed, and assuming a coefficient of friction of 0.1, a pulling force of 100 pounds is required for every square inch of pressure area. For a belt 4 feet wide and 25 feet long there would accordingly be a total required pulling force of about 1,440,000 pounds. The power required to pull this load at 3 feet per minute is approximately 130 H. P. At these low speeds and high pressures it is impractical to drive the pulley with standard gearing as the tooth pressures would be excessive and the gear train would be enormous.

Figs. 5 and 6 show a hydraulically operated driving mechanism, in accordance with the invention, which has proved to be efficient and reliable in practical operation. Upon both ends of each of the pulleys 5, 5', I provide extensions 40, 40' of reduced diameter to each of which are secured two circular flanges 41, 41' of uniform diameter substantially equal to that of the pulleys 5, 5'. From the opposite side of each flange there extend aligned drive pins 42, 42' which are uniformly spaced and are disposed adjacent to the peripheries of the flanges. The corresponding flanges and pins on extensions 40, 40' of the pulleys are in vertical alignment, as shown in Fig. 6.

The pulleys 5, 5' are driven by way of the flanges 41, 41' and the pins 42, 42' thereon by the following mechanism. I provide two sets of hydraulic cylinders 43, 43', the cylinders 43, 43 operating in unison, and likewise the cylinders 43', 43'. The piston rods 44, 44' of the four cylinders are each provided with a crosshead 45, 45', respectively, pivotally connected to connecting rods 46, 46'. To the upper end of each of the rods 46, 46' is pivoted two pairs of push rods 47, 47', the rods 47 being arranged to engage the pins 42 on the flanges 41 associated with the drive pulley 5, while the rods 47' engage the pins 42' on the flanges 41' associated with the upper drive pulley 5'. The upper push rods 47' are urged upwardly by springs 48' into engagement with the pins 42', while the lower rods 47 are held in engagement with pins 42 by gravity. Each of the rods is provided with an approximately semi-circular recess 49, 49' for snugly receiving the pins 42, 42', and they are further provided with overhanging extensions 50, 50' to insure proper engagement between the push rods and pins.

The cylinders of each pair of cylinders 43, 43 and 43', 43' simultaneously receive fluid under pressure to one or the other side of their pistons through the supply conduits 51, 51', such supply conduits each acting also as a discharge conduit when pressure fluid is supplied to the other conduit of the cylinder, suitable valve arrangements (not shown) being provided to time the operation of the cylinders. The cylinders 43, 43 operate out of phase with reference to cylinders 43', 43' in such manner that the power strokes of the pistons overlap, so that as the push rods 47 pivoted to the connecting rods 46 approach the end of their power stroke, the push rods pivoted to the connecting rods 46' begin their power stroke on the next set of pins. The return movements of the push rods being faster than their power strokes, overlapping of such strokes is readily secured and a continuous movement of the belt and of the compressed board through the machine is obtained.

It will be evident from the foregoing that the hydraulic cylinders operate the lower and upper drive pulleys 5, 5' simultaneously and at the same speed. It will also be noted that the force is applied to the drive pins as near to the belt line, that is, as near to the plane of the belts, as possible, so that a more direct pull on the belts is secured. Also since the cylinders always act simultaneously on each side of each of the drive pulleys, the pressure on both sides of each pulley is equalized.

The source of hydraulic power is indicated diagrammatically at 52 in Fig. 1, the pressure fluid being controlled from the panel 53a at which the speed of operation of the cylinders can be varied. Being piped together, the cylinders of each pair must exert equal force on the drive pins, since one cannot move ahead of the other as it is restrained by the pulley itself, no one cylinder alone being able to rotate a drive pulley. The two pairs of cylinders can be controlled electronically or mechanically in such manner that when one pair is moving the drive pulley forward, the second pair is returning to its starting position, and at the proper moment moves forward to engage the next set of drive pins and take up the load and continue the forward motion of the pulleys without interruption. In this way, the reciprocating motion of the hydraulically operated pistons is converted into rotary motion of the drive pulleys.

One of the major difficulties encountered in the use of a flat endless steel band of the size required in the machine of the present invention (such belt being approximately 4 feet wide and from 100 to 200 feet long) is to keep it running true. A steel belt reacts on a pulley in exactly the opposite manner from that of a leather or cloth belt; that is, whereas a leather or cloth belt will always travel to the high side or crown of the pulley, a steel belt will tend to travel to the low pressure side of the pulley. In accordance with a further feature of the present invention, therefore, provision is made for maintaining a uniform tension on the steel band on both sides of the pulley, so that there is substantially no relatively high or low side on the pulley and the belt runs true to a satisfactory degree. As shown in Figs. 1 and 8, this is accomplished by the use of the hydraulically interlocked take-up cylinders 53, 53', a pair of which is associated with the ends of each of the pulleys 4, 4'. The cylinders, which are charged with a fluid under pressure from the same source of supply, each contains a piston 54, 54' connected by a rod 55, 55' to a journal block 56, 56' which slide in horizontally extending rectangular apertures 57, 57' in the bearing plates 16, 16' forming part of the frame or housing of the machine. Within suitable seats in the blocks 56, 56' are received trunnions 58, 58' secured to the axle of the guide and take-up pulleys 4, 4'. As indicated in Fig. 8, the blocks 56, 56' and trunnions 58, 58' form a ball joint which permits the pulleys to take up an oblique position (which is shown in exaggerated fashion in Fig. 8 for the sake of clearness) with reference to the central axis of the belt in the horizontal plane, so that unevennesses in the length of the belt are generally fully compensated by angular adjustment of the pulley axes, with the result that the tension on the belts is maintained substantially uniform along the length of the pulleys, and the tendency of the belt to travel to a low pressure side of the pulley is obviated. It will be apparent that the pistons in the several cylinders move independently of each other in a horizontal plane while maintaining at all times the load on the axles. As all of the cylinders are supplied with a pressure medium under the same pressure, and as all of the pistons are of the same diameter, the pressure of the pulleys against the belts is maintained uniform. In addition to irregularities in the fabricated steel bands, the take-up mechanism will allow also for the expansion and contraction of the belts as they become heated during the operation of the machine or cool down on stoppage of the machine.

It will be seen from the foregoing that I have provided a machine which accomplishes the objectives hereinabove stated, and in particular operates in such manner that relative motion between the particles as they are conveyed by the belts is practically completely eliminated, and particularly during the curing and setting of the binder. The hardened or solidified binder is, therefore, not subjected to any stresses which are liable to flex or break the resinous bonds between the particles. This is accomplished by the use of the continuous thin steel bands of high tensile strength, their thickness being of the order of about 0.050 inch, and by providing beds against which the belts press under the action of the material being processed and which are completely rigid in the transverse (vertical) direction. The mechanism is so constructed that it can readily take up temperatures of 500 to 600° F., without distortion or injury to any of the parts. The electrical heating elements provide a highly efficient means for quickly raising the temperature of the compressed particles to the required degree, such heating being not only by direct conduction of heat through the metallic blocks 28 to the continuous steel bands (the compressed carbon blocks 35, when used, having fairly good heat conductivity and being relatively thin, so that they offer little resistance to the flow of heat) but also by radiation from the heating elements. The use of the insulating backing 27, aside from reducing the loss of heat, also protects the other parts of the machine against distortion and damage resulting from excessive expansion and contraction, which would cause the belts to travel unevenly. Because of the small mass of the belts very little heat is lost in heating the same. The lubricating carbon blocks, which can, if desired, be replaced by thin layers of suitable metals or other materials capable of taking on a high polish, like chromium and various alloys, or by various lubricating metal powders or other substances capable of withstanding the temperatures utilized in the machine (up to about 600° F.), effectively reduce the friction which the belts must overcome; hence, the power requirements of the machine, while still quite high, are much less than would otherwise be the case. The improved driving mechanism shown in Figs. 5 and 6 further insures that the belts will at all times travel together at the same speeds. Since the two hydraulic cylinders composing each pair (43, 43 or 43', 43') are hydraulically interconnected, the work is divided evenly between them and as the power of the cylinders is preferably so determined that one of them is unable to drive its belt, one cannot get ahead of or behind the other. The illustrated driving mechanism inherently effects uniform travel of both belts and the power is transmitted to both belts evenly, so that no excessive stress is imposed on either belt.

The superior efficiency of the electrical heating coils is demonstrated by the fact that tests have shown that with the same temperature differential between the heating portions of the beds and the entering comminuted material, and between the heated material and the cooling portions of the beds (over a range of 225° F. to 500° F.), the heating time is one-half that of the cooling time for the same temperature change, despite the fact that the heating is retarded and the cooling favored by the lower temperature of the ambient atmosphere. Consequently, the bed of the machine can be so divided that about half as much of its length is employed for heating as for cooling.

As already indicated, one of the serious problems connected with the operation of a machine of the type above described, which is constructed to a large extent of massive metallic parts, is to make adequate provision for expansion and contraction to prevent damage. Owing to the length of the beds (usually a minimum of about 30 feet overall) and to the overall length of the machine (a minimum of about 50 feet), the unavoidable temperature changes would in a short time cause strains and distortions that would upset the operation of the machine. The most serious possible damage resulting from temperature changes is overcome in accordance with the invention by keeping the upper and lower beds disconnected from the frame of the machine, and providing a sliding or rolling support for the beds which permits expansion and contraction along the lengths and widths of the beds without stressing the supporting frame.

The compressed and unified product emerges from the machine as a continuous sheet or board, as indicated at 59. The nature of the binder determines whether the finished product will be a relatively flexible one, such as composition cork, or relatively stiff and rigid, such as wallboard, which can be made from fibrous materials of various kinds. In the case of the latter type of product, the continuous board discharging from the machine can be cut to the desired size by any standard saw equipment; while in the case of a flexible product, the same can be coiled into a roll, as shown at 60, which can be formed on power-driven rollers 61.

As will be understood by persons skilled in the art, variations from these specific constructions and dimensional relationships can be resorted to within the scope of the appended claims without departing from the spirit of the invention.

I claim:

1. Apparatus for the continuous manufacture of boards or sheets from cork particles, comprising a frame, a heat-conducting lower bed supported on the frame and presenting a smooth, flat surface, a flat endless metallic conveyor belt arranged to move over said surface, pulleys for driving and guiding the belt, the active upper run of said belt passing over said bed, feeding mechanism for continuously charging a mass of said particles onto the belt, a second flat, endless metallic conveyor belt disposed above the first belt with its lower active run overlying and moving in the same direction as the upper active run of the first belt, a heat-conducting upper bed presenting a smooth surface against which the lower run of the upper belt bears, driving and guiding pulleys for the second belt, said beds being parallel to each other for the greater portion of their lengths, electrical heating means disposed in the beds at their charging end, the beds at their discharging ends being provided with passageways for receiving a cooling fluid, and means for laterally confining the particles between the active runs of the belts.

2. Apparatus as defined in claim 1, wherein the beds each includes a plurality of metallic sections secured together through expansion joints to form a continuous structure, the electrical heating means and the cooling fluid passageways being disposed in said sections.

3. Apparatus according to claim 1, wherein the beds are structurally detached from the frame, means for floatingly supporting the beds on the frame, and means for blocking movement of the beds in the forward direction under the action of the traveling belts.

4. Apparatus for the continuous manufacture of boards or sheets from cork particles, comprising a frame, a heat-conducting lower bed presenting a stationary smooth, flat surface, a flat endless metallic conveyor belt arranged to move over said surface and in continuous contact therewith, pulleys mounted on the frame for driving and guiding the belt, the active upper run of said belt passing over said bed, feeding mechanism for continuously charging a mass of said particles onto the belt, a second flat, endless metallic conveyor belt disposed above the first belt with its lower active run overlying and moving in the same direction as the upper active run of the first belt, a heat-conducting upper bed presenting a stationary smooth surface against which the lower run of the upper belt directly bears in continuous surface contact therewith, driving and guiding pulleys for the second belt, heating means disposed in said beds, said beds being structurally detached from the frame, and means for floatingly supporting said beds on said frame to allow free longitudinal expansion and contraction of said beds along the whole length thereof.

5. Apparatus according to claim 4, wherein the upper bed is supported on the lower bed, and including stop plates extending transversely across the machine for limiting the forward movement of the beds under the pulling action of the belts, and shoes secured to the frame and upon which the rear portion of the lower bed movably rests.

6. Apparatus for the continuous manufacture of boards or sheets from cork particles, comprising a frame, a heat conducting lower bed supported on said frame and presenting a smooth flat surface, a flat endless metallic conveyor belt arranged to move over said surface and in continuous surface contact therewith, pulleys for driving and guiding the belt, the active upper run of said belt passing over said bed, feeding mechanism for continuously charging a mass of said particles onto the belt, a second flat, endless metallic conveyor belt disposed above the first belt with its lower active run overlying and moving in the same direction as the upper active run of the first belt, a heat-conducting upper bed presenting a smooth surface against which the lower run of the upper belt bears and in continuous surface contact therewith, driving and guiding pulleys for the second belt said beds being parallel to each other for the greater portion of their lengths, heating means disposed in the beds at their charging ends for heating the material therebetween, and means for laterally confining the particles between the active runs of the belts, the facing surfaces of the beds providing substantially continuous anti-friction surfaces against which the belts are forced by the expanded particles, whereby said belts slide directly on said surfaces.

7. Apparatus according to claim 6, wherein the upper bed is supported on the lower bed, and means for vertically supporting the beds.

8. Apparatus according to claim 6, wherein the upper bed is supported on the lower bed, means for lifting the upper bed bodily with respect to the lower bed to effect separation of the belts, and means for locking the upper bed in selected position with respect to the lower bed.

9. Apparatus according to claim 8, wherein the locking means comprises vertical posts secured to the lower bed, said posts provided with recesses having inclined walls, and wedge-shaped blocks movable into said recesses to engage said inclined walls and lock the upper bed against said posts.

10. Apparatus according to claim 6, wherein the upper bed is supported on the lower bed, means for lifting the upper bed with respect to the lower bed, the locking means comprising vertical posts secured to the lower bed, said posts provided with recesses having inclined upper walls, wedge-shaped blocks movable into said recesses to lock the upper bed against said posts, and mechanism for moving said wedges comprising a floating piston and cylinder connected respectively to each of a pair of oppositely moving wedges, conduits for supplying and discharging a pressure medium to and from the cylinders, and stops for limiting the withdrawal movement of the wedges.

11. Apparatus according to claim 10, including hydraulically operated pistons for lifting the upper bed upon withdrawal of the wedges.

12. Apparatus for the continuous manufacture of boards or sheets from discrete particles, comprising a heat-conducting lower bed presenting a smooth, flat surface, a flat endless metallic conveyor belt having an active upper run and an inactive lower run pulleys for driving and guiding the belt so as to cause the active upper run of said belt to pass over said bed, feeding mechanism for continuously charging a mass of said particles onto the belt, a second flat, endless metallic conveyor belt disposed above the first belt and having a lower active run overlying and moving in the same direction as the upper active run of the first belt, a heat-conducting upper bed presenting a smooth surface against which the lower run of the upper belt bears, driving and guiding pulleys for the second belt, heating means disposed in the beds at their charging end, a hollow metallic rectangular structure supporting each of said beds, a layer of insulation below the lower bed and a layer of insulation above the upper bed, each of said beds comprising a plurality of metallic blocks supported against the inner face of the respective insulating layer, said blocks being apertured for receiving heating or cooling elements, said blocks being shouldered at their ends and being spaced from each other lengthwise of the belts, and clamping members between adjacent blocks engaging the shouldered ends thereof and secured to the hollow metallic structures, whereby said blocks are free to expand and contract while presenting a substantially continuous surface.

13. Apparatus for the continuous manufacture of boards or sheets from heat-expandible discrete particles, comprising a frame, a heat-conducting lower bed supported on the frame and presenting a smooth, flat surface, a flat endless metallic conveyor belt arranged to move over said surface, pulleys for driving and guiding the belt, the active upper run of said belt passing over said bed, feeding mechanism for continuously charging a mass of said particles onto the belt, a second flat, endless metallic conveyor belt disposed about the first belt with its lower active run overlying and moving in the same direction as the upper active run of the first belt, a heat-conducting upper bed presenting a smooth surface against which the lower run of the upper belt bears, driving and guiding pulleys for the second belt, heating means disposed in the beds at their charging end, the beds at their discharging ends being provided with passageways for receiving a cooling fluid, and means for laterally confining the particles between the active runs of the belts, the belt-engaging surfaces of the beds being provided by compressed carbon blocks secured to present substantially continuous anti-friction surfaces.

14. Apparatus for the continuous manufacture of boards or sheets from discrete particles, comprising a heat-conducting lower bed presenting a smooth, flat surface, a flat endless metallic conveyor belt arranged to move over said surface, pulleys for driving and guiding the belt, the active upper run of said belt passing over said bed, feeding mechanism for continuously charging a mass of said particles onto the belt, a second flat, endless metallic conveyor belt disposed above the first belt with its lower active run overlying and moving in the same direction as the upper active run of the first belt, a heat-conducting upper bed presenting a smooth surface against which the lower run of the upper belt bears, driving and guiding pulleys for the second belt, heating means disposed in the beds at their charging end, said beds each including a hollow metallic rectangular structure, a layer of insulation overlying the inner surface of said structures, a plurality of metallic blocks supported against the inner faces of said insulating layers, said blocks being apertured for receiving heating or cooling elements, said blocks being spaced from each other lengthwise of the belts, clamping members between adjacent blocks and secured to the hollow metallic structures, whereby said blocks are free to expand and contract while presenting a substantially continuous surface, and compressed carbon plates secured to the metal blocks and presenting an anti-friction surface for engagement by the belts.

15. Apparatus for the continuous manufacture of cork boards or sheets from discrete, resin-containing cork particles, comprising a heat-conducting lower bed having a substantially continuous, smooth, flat surface, a flat, integral, endless metallic conveyor belt, pulleys for driving and guiding the belt, the active, upper run of said belt passing over said bed and in direct contact therewith, feeding mechanism for continuously charging a mass of cork particles onto the belt, means for confining the particles on the belt within a reduced volume and including a substantially continuous heat-conducting upper bed above said lower bed, a travelling flat, integral, endless metallic conveyor belt whose lower active run overlies the first belt and is arranged to engage the mass of cork particles on the first belt, the lower run of the upper belt bearing against the under face of said upper bed, pulleys about which the upper belt passes, said beds being parallel to each other for the greater portion of their lengths and except at the charging ends of the belts, the charging ends of the beds being at an angle to each other and converging toward the parallel portions of the beds to cause the belts to compress the mass of cork particles therebetween, heating means disposed in the beds adjacent to the facing surfaces thereof for heating the particles while they are in motion between the belts to a sufficient degree to fuse the resin therein, the heat passing from the heating means by direct conduction through the beds and belts to the compressed particles, means separate from the belts for laterally confining the particles between the belts, and means for cooling the compressed board before it is discharged from the belts.

16. Apparatus according to claim 15, wherein the means for laterally confining the particles between the belts comprise rigid guards at the sides of said belts.

References Cited in the file of this patent

UNITED STATES PATENTS

| Number | Name | Date |
|---|---|---|
| 541,528 | Frey | June 25, 1895 |
| 835,737 | Simmons et al. | Nov. 13, 1906 |
| 842,356 | Stone | Jan. 29, 1907 |
| 1,222,958 | Lienesch | Apr. 17, 1917 |
| 1,308,111 | Porzel | July 1, 1919 |
| 1,556,118 | Lee | Oct. 6, 1925 |
| 1,560,481 | Mulholland | Nov. 3, 1925 |
| 1,708,178 | Hottel | Apr. 9, 1929 |
| 1,835,914 | Stockdale | Dec. 8, 1931 |
| 1,845,257 | Ferris | Feb. 16, 1932 |
| 2,046,047 | Watkins | June 30, 1936 |
| 2,075,735 | Loomis | Mar. 30, 1937 |
| 2,096,338 | Randall | Oct. 19, 1937 |
| 2,135,763 | Nicholson | Nov. 8, 1938 |
| 2,288,611 | DeWyke | July 7, 1942 |
| 2,528,168 | Paulsen | Oct. 31, 1950 |
| 2,580,200 | Shrimpton | Dec. 25, 1951 |
| 2,590,757 | Cornelius et al. | Mar. 25, 1952 |
| 2,697,254 | Gordon | Dec. 21, 1954 |